US009896967B2

(12) United States Patent
Lischer

(10) Patent No.: US 9,896,967 B2
(45) Date of Patent: Feb. 20, 2018

(54) TURBOCHARGER

(75) Inventor: Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/320,286

(22) PCT Filed: May 17, 2010

(86) PCT No.: PCT/US2010/035051
§ 371 (c)(1),
(2), (4) Date: Nov. 14, 2011

(87) PCT Pub. No.: WO2010/135209
PCT Pub. Date: Nov. 25, 2010

(65) Prior Publication Data

US 2012/0057975 A1 Mar. 8, 2012

(30) Foreign Application Priority Data

May 19, 2009 (DE) ........................ 10 2009 021 864

(51) Int. Cl.
*F02C 6/12* (2006.01)
*F01D 25/16* (2006.01)

(52) U.S. Cl.
CPC ........ *F01D 25/162* (2013.01); *F05D 2220/40* (2013.01); *F05D 2300/5024* (2013.01)

(58) Field of Classification Search
CPC ........... F01D 25/162; F05D 2300/5024; F05D 2220/40
USPC ......................... 60/597, 598, 605.1; 384/476
See application file for complete search history.

(56) References Cited

U.S. PATENT DOCUMENTS

| | | | | |
|---|---|---|---|---|
| 4,482,303 | A * | 11/1984 | Acosta | 417/406 |
| 4,735,556 | A * | 4/1988 | Fujikake | F01D 25/145 165/904 |
| 5,549,449 | A * | 8/1996 | McInerney et al. | 415/177 |
| 2003/0108428 | A1* | 6/2003 | Bosen | 416/244 A |
| 2005/0244275 | A1* | 11/2005 | Saville | 416/244 A |
| 2005/0257522 | A1* | 11/2005 | Fremerey et al. | 60/605.3 |
| 2005/0280139 | A1* | 12/2005 | Zhao | H01L 23/24 257/704 |
| 2007/0113552 | A1* | 5/2007 | Fremerey et al. | 60/605.1 |
| 2007/0172395 | A1* | 7/2007 | Lim | B01L 3/50851 422/400 |

(Continued)

FOREIGN PATENT DOCUMENTS

DE 10260042 A1 * 7/2004 ............. F01D 25/24

OTHER PUBLICATIONS

Machine Translation of DE 10260042 A1 to Zimbal.*

*Primary Examiner* — Mark Laurenzi
*Assistant Examiner* — Brandon Lee
(74) *Attorney, Agent, or Firm* — Eric L. Doyle; Stephan A. Pendorf; Patent Central LLC

(57) ABSTRACT

A turbocharger (1) in which the bearing-housing-side diffuser wall is thermally decoupled in order to reduce the heat introduction at the bearing housing cover (5). The turbocharger (1) includes a turbine (2), a compressor (3) which has a diffuser, and a bearing housing (4) which is arranged between the turbine (2) and the compressor (3) and which has the bearing housing cover (5). The bearing housing cover (5) is composed of a material with a low thermal conductivity of at most 5 W/mK, for example a temperature-resistant plastic.

7 Claims, 3 Drawing Sheets

(56) References Cited

U.S. PATENT DOCUMENTS

| | | | | |
|---|---|---|---|---|
| 2008/0080966 | A1* | 4/2008 | Ueno et al. | 415/112 |
| 2008/0087018 | A1* | 4/2008 | Woollenweber | F01D 25/16<br>60/605.3 |
| 2008/0098735 | A1* | 5/2008 | Gutknecht | 60/605.3 |
| 2009/0031722 | A1* | 2/2009 | An | F02B 37/013<br>60/600 |
| 2010/0247343 | A1* | 9/2010 | Shimizu | F01D 25/12<br>417/410.1 |
| 2012/0033908 | A1* | 2/2012 | House et al. | 384/476 |

* cited by examiner

TURBOCHARGER

BACKGROUND OF THE INVENTION

Field of the Invention

The invention relates to a turbocharger.

Description of the Related Art

A generic turbocharger is known from EP 1 256 703 B1. Turbochargers of said type are used in internal combustion engines in order to increase the engine characteristic values such as power and torque and to reduce exhaust-gas emissions and specific fuel consumption. At low circumferential speeds of the compressor wheel, a temperature increase of the compressor air flow occurs at the bearing-housing-side housing wall of the compressor diffuser. Since the metal bearing housing constitutes the connecting element between the metal turbine housing and the metal compressor housing, considerable internal heat transfer takes place from the turbine side to the compressor side. In the prior art, the temperature increase arises in that, while thermally highly conductive metallic materials are used, the relatively low flow speeds generate an increased residence time of the fluid (air) in the compressor diffuser.

It is therefore an object of the present invention to provide a turbocharger for an internal combustion engine, which turbocharger reduces the introduction of heat from the bearing housing into the compressor diffuser in order to reduce the introduction of heat from the diffuser into the compressor air flow and to thereby increase the compressor efficiency, particularly at low circumferential speeds.

BRIEF SUMMARY OF THE INVENTION

In a particularly preferred embodiment of the turbocharger, therefore, it is provided that a radial enlargement of the bearing housing cover also covers the region of the diffuser wall of the bearing housing. To reduce the introduction of heat, the bearing housing cover is, in relation to the prior art, produced from a material with a considerably lower thermal conductivity of less than 5 W/mK and in particular of less than 1 W/mK, such as for example a temperature-resistant plastic. In this way, the thermal conductivity of the bearing housing cover can be reduced at least by a factor of 20 in comparison to metallic materials.

BRIEF DESCRIPTION OF THE SEVERAL VIEWS OF THE DRAWINGS

Further details, advantages and features of the present invention will emerge from the following description of exemplary embodiments on the basis of the appended drawings, in which.

DETAILED DESCRIPTION OF THE INVENTION

Figure 1:
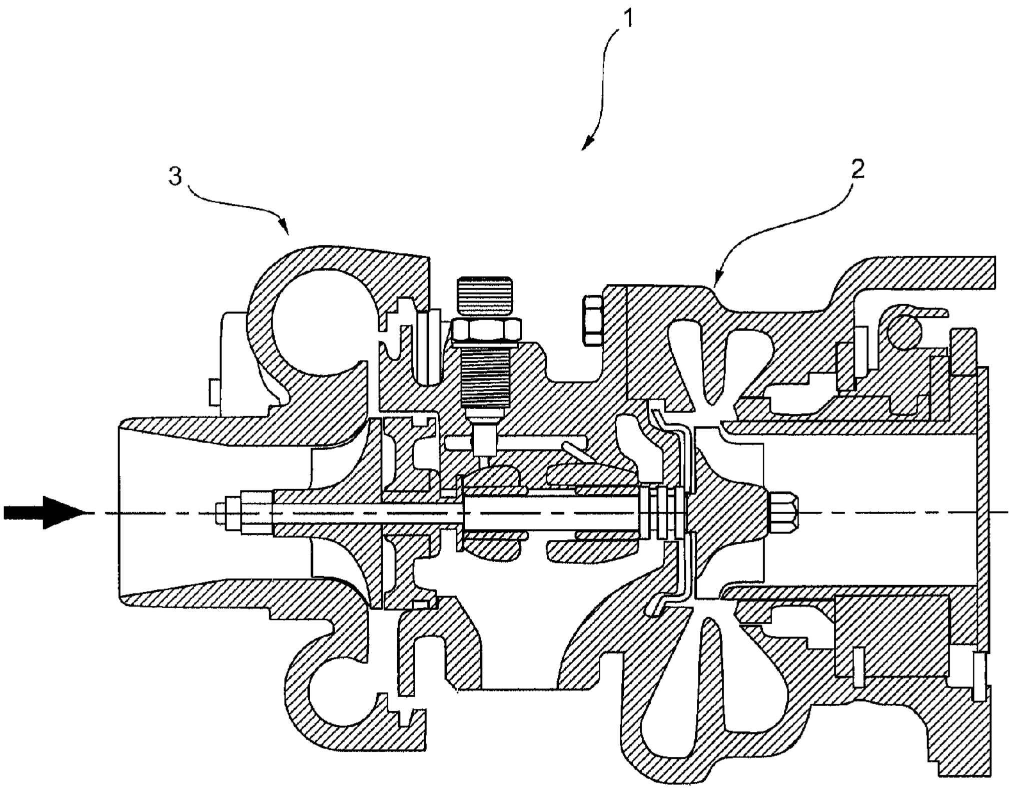
FIG. 1 shows a schematically highly simplified, cut-away illustration of an exhaust-gas turbocharger.

FIG. 1 shows a schematically highly simplified illustration of a turbocharger 1 which comprises a compressor 2 and a turbine 3. The turbocharger 1 self-evidently has all the other conventional components, the description of which is however not required for the explanation of the principles according to the invention and which has accordingly been omitted.

Figure 2:
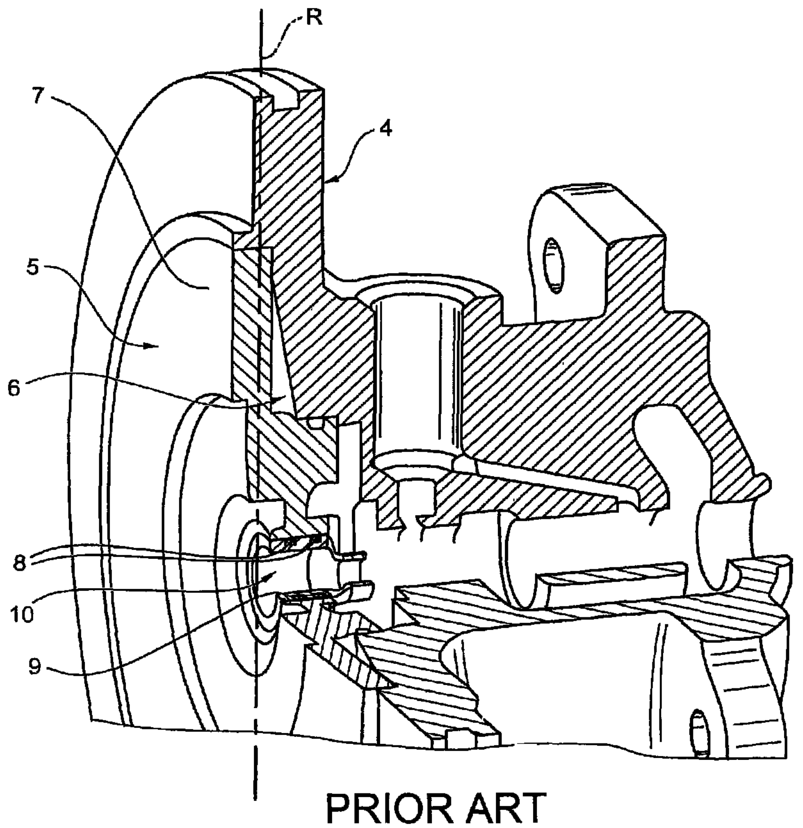
PRIOR ART FIG. 2
FIG. 2 shows a sectional illustration of a prior art bearing housing and bearing housing cover composed of metal.
Figure 3:
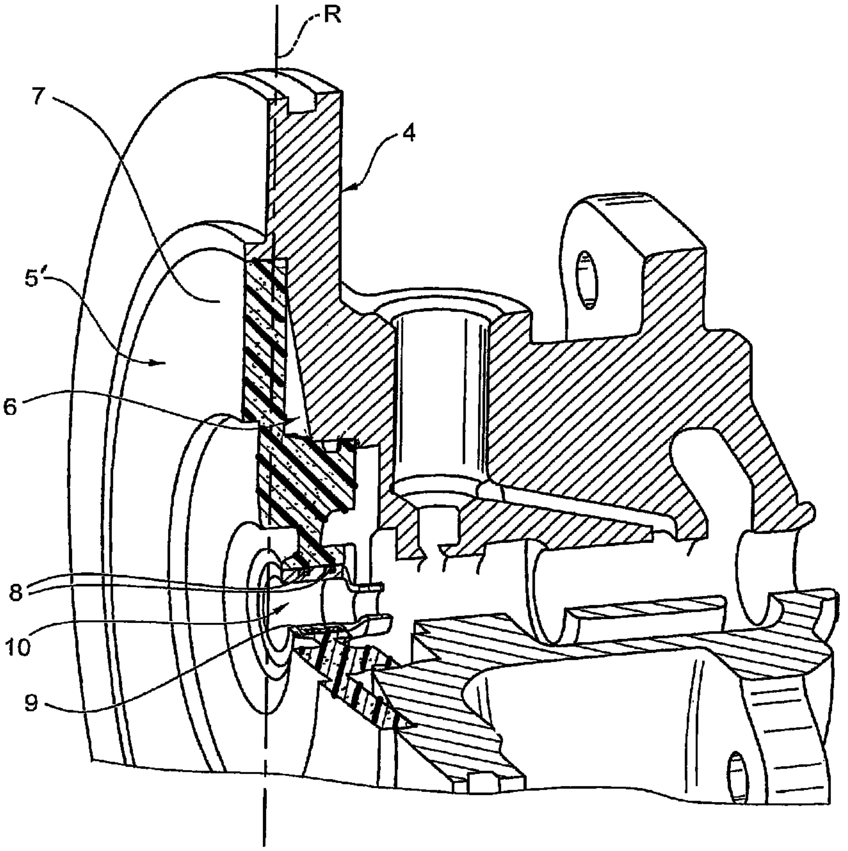
FIG. 3 shows a sectional illustration of a bearing housing with a bearing housing cover composed of plastic.

FIG. 2 illustrates an enlarged sectional view of a bearing housing 4 of a prior art turbocharger 1, which bearing housing 4 is arranged between the turbine 2 and the compressor 3 and has a metal bearing housing cover 5. Said bearing housing cover 5 is composed of metal in the prior art as shown in FIG. 2, while in the present invention it is composed of a material with low thermal conductivity as shown in FIG. 3, for example a temperature-resistant plastic, whose thermal conductivity is less than 5 W/mK. As can be seen from FIG. 3, the low thermal conductivity material bearing housing cover 5' has been enlarged to such an extent that it can also cover the region of the diffuser wall (not illustrated in FIGS. 2 and 3) of the compressor 2.

To obtain a further reduction in the heat flow from the bearing housing 4 to the bearing housing cover 5', a cavity 6 is provided between the bearing housing cover 5' and the bearing housing 4. Said cavity 6 is arranged in an outer cover region 7 as viewed in the radial direction R of the bearing housing cover 5'. The air in said cavity 6 has a thermal conductivity which, at a maximum, is lower than that of the plastic of the bearing housing cover 5' by a factor of 200, and said air thereby forms a further insulating layer between the bearing housing 4 and bearing housing cover 5'.

The bearing housing cover 5' may also have a metal bush 10 in the region of a cover bore 9 which holds piston rings 8, in order to prevent increased wear of the non-metallic bearing housing cover at the point of contact with the piston rings 8.

To complement the above written disclosure, reference is made explicitly to the diagrammatic illustration in FIGS. 1, 2 and 3 of the invention.

LIST OF REFERENCE NUMERALS

1 Turbocharger
2 Turbine
3 Compressor
4 Bearing housing
5 Bearing housing cover (metal)
5' Bearing housing cover (low thermal conductivity material)
6 Cavity
7 Cover region
8 Piston rings
9 Cover bore
10 Metal bush

The invention claimed is:

1. A turbocharger (1) comprising:

a metal turbine housing (2), a metal compressor housing (3) which has a diffuser for decelerating air, a metal bearing housing (4) which is arranged between the turbine housing (2) and the compressor housing (3), wherein the metal turbine housing (2) is fixed to a turbine side of the metal bearing housing (3) and the metal compressor housing (3) is fixed to a compressor side of the metal bearing housing (4), and wherein the metal bearing housing (4) is attached to and physically spaces the metal turbine housing (2) apart from the metal compressor housing (3), and a bearing housing cover (5') connected to the compressor side of the bearing housing and defining at least a part of the compressor diffuser, wherein the bearing housing cover (5') is made of a material with a thermal conductivity of less than 5 W/mK.

2. The turbocharger (1) as claimed in claim 1, wherein the bearing housing cover (5') is composed of a temperature-resistant plastic.

3. The turbocharger (1) as claimed in claim 2, wherein the thermal conductivity of the bearing housing cover (5') is at most 1 W/mK.

4. The turbocharger (1) as claimed in claim 1, wherein bearing housing cover (5') forms a diffuser wall of the compressor housing (3).

5. A turbocharger (1) comprising:

a metal turbine housing (2), a metal compressor housing (3) which has a diffuser for decelerating air, a metal bearing housing (4) which is arranged between the turbine housing (2) and the compressor housing (3), wherein the metal turbine housing (2) is fixed to a turbine side of the metal bearing housing (3) and the metal compressor housing (3) is fixed to a compressor side of the metal bearing housing (4), and wherein the metal bearing housing (4) is attached to and physically spaces the metal turbine housing (2) apart from the metal compressor housing (3), and a bearing housing cover (5') connected to the compressor side of the bearing housing and defining at least a part of the compressor diffuser, wherein the bearing housing cover (5') is made of a plastic material with a thermal conductivity of less than 1 W/mK, and a radially extending cavity (6) is provided between the bearing housing cover (5') and the bearing housing (4).

6. The turbocharger (1) as claimed in claim 5, wherein the cavity (6) is provided in an radially outer cover region (7).

7. The turbocharger (1) as claimed in claim 1, wherein the bearing housing cover (5') includes a cover bore (9), wherein a metal bush (10) is received in the cover bore (9), and further including piston rings (8), wherein the cover bore (9) holds the piston rings (8).

* * * * *